UNITED STATES PATENT OFFICE.

HENSON BRIDGE, OF DECORAH, IOWA.

REMEDY FOR HOG CHOLERA.

SPECIFICATION forming part of Letters Patent No. 341,312, dated May 4, 1886.

Application filed December 2, 1885. Serial No. 184,492. (No specimens.)

*To all whom it may concern:*

Be it known that I, HENSON BRIDGE, a citizen of the United States, residing at Decorah, in the county of Winneshiek and State of Iowa, have invented a new and useful Composition of Matter to be used as a Remedy for what is known as "Swine Plague," "Swine Epidemic," or so-called "Hog Cholera," of which the following is a specification.

My composition consists of the following ingredients, in the proportions stated, viz: Fluid extract of lobelia, ten ounces; fluid extract of fox-glove, five ounces; Venice turpentine, one-half ounce; pulverized castile-soap, one-half ounce. These ingredients are to be thoroughly mingled by agitation.

The above-named composition is designed to be taken internally in any proper quantity. I have found from fifteen to twenty drops to be a very suitable dose, and this may be repeated at intervals of every two hours, if occasion demands.

This composition has been found in practice to be an efficient remedy as a preventive in the treatment of swine plague, swine epidemic, or so-called "hog cholera."

While the component parts of the invention may consist of the proportions heretofore mentioned, I would have it understood that the proportions may be varied somewhat without departing from the scope of my invention. I have found, however, that the proportions stated give very satisfactory results.

What I claim, and desire to secure by Letters Patent of the United States, is—

The herein-described composition of matter to be used as a remedy for swine diseases, consisting of lobelia, fox-glove, turpentine, and soap, substantially in the proportions specified.

In testimony whereof I sign this specification in the presence of two witnesses.

HENSON X BRIDGE.
his   mark

Witnesses:
J. B. DOW,
C. D. HARRIS.